Sept. 29, 1970   J. S. NISSAN   3,531,431
PROCESS FOR THE POLYMERIZATION OF VINYL PYRIDINE
Filed Sept. 21, 1966
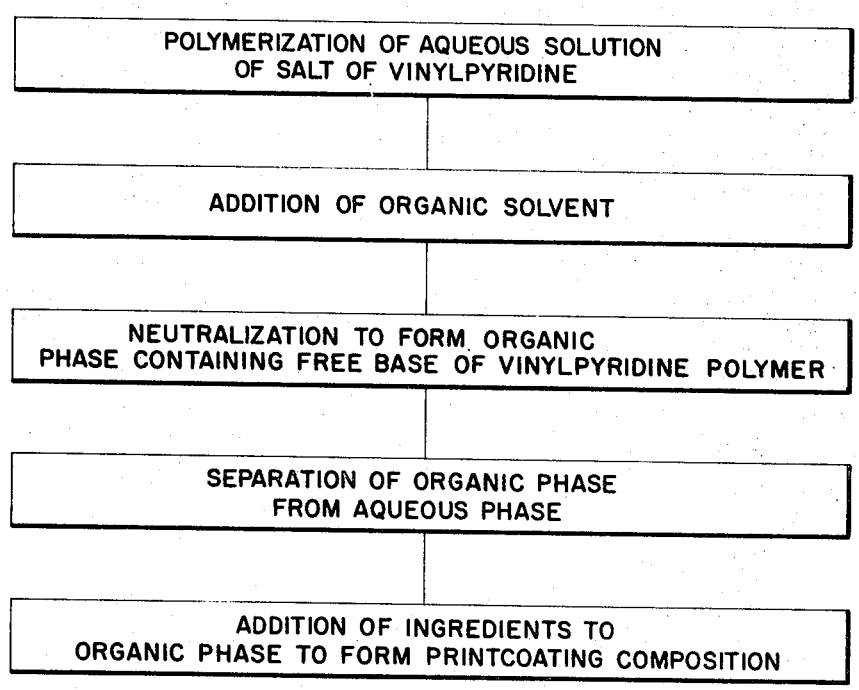
INVENTOR.
Joseph S. Nissan
BY
Brown and Mikulka
and
Alvin Isaacs
ATTORNEYS United States Patent Office 3,531,431
Patented Sept. 29, 1970

3,531,431
**PROCESS FOR THE POLYMERIZATION
OF VINYL PYRIDINE**
Joseph S. Nissan, Watertown, Mass., assignor to Polaroid Corporation, Cambridge, Mass., a corporation of Delaware
Filed Sept. 21, 1966, Ser. No. 580,931
Int. Cl. C08f 5/00, 7/12
U.S. Cl. 260—32.8                                16 Claims

ABSTRACT OF THE DISCLOSURE

Novel process for preparing vinylpyridine polymer free bases and for preparing compositions including the same for washing and protecting photographic silver images.

---

This invention relates to the treatment of acid salts of polymers and, more particularly, to novel procedures for neutralizing such salts, e.g. acid salts of polyvinylpyridines, and to the subsequent formation of compositions containing the free base obtained by neutraization.

A primary object of this invention is to provide novel procedures for treating polymers.

Another object is to provide novel procedures for treating the acid salts of polymers to obtain the free base derivatives thereof.

Still another object is to provide novel procedures for preparing water-insoluble polymers.

Yet another object is to provide a novel procedure for preparing vinylpyridine polymers and compositions containing the same.

A further object is to provide a novel procedure for preparing compositions useful for washing and protecting photographic silver images such as those obtained by diffusion transfer.

Other objects of the invention will in part be obvious and will in part appear hereinafter.

The invention accordingly comprises the process involving the several steps and the relation and order of one or more of such steps with respect to each of the others which are exemplifid in the following detailed disclosure, and the scope of the application of which will be indicated in the claims.

For a fuller understanding of the nature and objects of the invention, reference should be had to the following detailed description taken in connection with the accompaning drawing wherein:

The figure is a flow sheet illustrating the novel system of this invention as applied to the preparation of compositions for washing and protecting photographic silver images.

In the preparation of water-insoluble polymers containing basic groups, it is the practice first to form a water-soluble acid salt of the monomer, polymerize an aqueous solution of this salt to form the water-soluble polymer salt, and thereafter neutralize to precipitate from the aqueous medium the insoluble free base of the polymer which is then recovered for use in the desired manner.

By way of example, U.S. Pat. No. 2,491,472 relates to the polymerization of vinylpyridines in this manner. As disclosed in this patent, an aqueous solution of a monomeric vinylpyridine salt is prepared by treating a basic vinylpyridine monomer with at least a chemically equivalent amount of a mineral acid. The aqueous solution of vinylpyridine salt thus formed is then subjected to polymerization conditions, preferably in the presence of a peroxygen compound catalyst, after which the free polymeric base is obtained by precipitation with alkaline neutralizing agents, followed by filtration, washing with water and drying. Included within the scope of polymers prepared in this way are vinylpyridine homopolymers, e.g. alpha-, beta- or gramma-vinylpyridines and homologues thereof containing an alkyl radical attached to an annular carbon atom of the pyridine ring. Mixtures of two or more monomeric vinylpyridine salts may be employed if desired. Also included are copolymers obtained by admixing with the monomeric salt other polymerizable vinyl or vinylidine compounds.

Vinylpyridine homopolymers and copolymers prepared in the foregoing manner have heretofore been employed as an ingredient of various compositions including an organic solvent. Of particular interest in this invention are compositions containing a vinylpyridine polymer and which are employed for washing and protecting a photographic silver image, e.g. a positive silver image obtained by diffusion transfer systems utilizing Polaroid Land roll films and film packs. Such compositions, hereinafter designated as "printcoaters," are disclosed for example, in U.S. Pats. Nos. 2,830,900; 2,874,045; 2,866,705; and 2,979,477. Included within the scope of vinylpyridine polymers useful in such printcoaters are homopolymers such as poly-2-vinylpyridine, poly-3-vinylpyridine, poly-4-vinylpyridine, poly-5-vinyl-2-methyl pyridine, poly-2-vinyl-5-ethyl pyridine, poly-2-vinyl-6-methyl pyridine, etc.; and vinylpyridine copolymers wherein a vinylpyridine is the characteristic ingredient and which may be prepared by copolymerizing vinylpyridine or a derivative thereof with a monomer of suitable reactivity and double bond charge, e.g. methyl acrylate, acrylonitrile, styrene, ethyl methacrylate, etc.

In addition to the vinylpyridine polymer, the printcoater compositions disclosed in the aforementioned patents contain a water-miscible organic solvent, e.g. a low molecular weight alcohol such as methanol, ethanol, propanol, isopropanol, dioxane, a low molecular weight ketone such as acetone, methylethyl ketone, etc., and various other ingredients performing specific designated functions.

The preparation of these printcoaters has involved essentially the steps of: (1) polymerization to form the acid salt; (2) addition of an alkaline material such as sodium hydroxide to neutralize and hence precipitate the free polymeric base; (3) removal of water and recovery of the polymer which is then washed with large quantities of water; (4) transfer of the polymer to another container where it is admixed with acetic acid and an organic solvent such as described above to form a homogeneous solution thereof; (5) analysis of the thus formed solution to determine the percent of polymer contained therein; (6) based upon this analysis, addition to the solution of the various other desired ingredients to form the printcoater; and finally (7) filtration of the printcollar and collection of the clear filter. [It will be noted that steps (1)–(3) are in the manner described in the aforementioned U.S. Patent No. 2,491,472.]

It has been found that the preparation of the vinylpyridine polymer in the foregoing manner presents certain significant disadvantages, particularly with regard to the yields, productivity, and purity of the desired product.

The polymeric base prepared by neutralization in the foregoing manner has been found to have entrained or entrapped therein appreciable amounts of monomer, catalyst and lower molecular weight polymer, so that the product is quite heterogeneous, the impurities varying from batch to batch. When a polymer prepared in this manner and having such entrained impurities is employed in compositions such as the above-mentioned printcoaters, these impurities tend to form a brown sludge which in turn causes "browning" or "yellowing" of the final product. This sludge is not easily removable by filtration to provide the desired clear composition. Moreover, it may result in tackiness of a print coated with such a composition.

The above-noted steps of neutralization, isolation and washing of the polymeric base are slow and laborious, thereby severely limiting the productivity potential of the process per man hour. These problems are compounded by the heterogeneous nature of the product and variance of yield (as noted below) so that the amount of polymer in the product varies from batch to batch, thereby requiring the above-noted step of analyzing a sample of the organic solution thereof to determine the amounts of other additives necessary to form the final printcoater. This analysis alone retards productivity. While the delimiting of productivity may not be a serious consideration on the laboratory scale, it will be appreciated that it may be of great moment when one is faced with the need to step-up production to meet the requirements of increased commercial usage.

Moreover, appreciable amounts of polymeric free base obtained in the neutralization step do not separate from the aqueous phase but are in fact dispersed therein, so that severe product loss is occasioned by drainage of the aqueous phase to recover the polymer. This drainage not only results in loss of yield, it also results in clogging of the drains and sewerage, a serious problem in itself.

Apart from these material disadvantages, the manual treatment and handling of the polymer and entrapped impurities required for its recovery and transfer to another container for admixture with the organic solvent exposes the worker to the noxious and irritating odors of the entrained unreacted monomer. Not only are these odors unpleasant, they also cause reddening and watering of the eyes, thereby requiring special care and equipment.

It is to these problems, and in particular to the need for increased production, to which the present invention is directed.

These problems have been obviated and the objectives accomplished by a novel procedure for neutralizing the polymeric salt to obtain the free base. The procedure by which this is accomplished may be defined as a non-isolation neutralization of the polymeric salt.

In accordance with this invention, an aqueous polymer salt solution, e.g. formed by polymerizing a vinylpyridine salt in the manner described in U.S. Pat. No. 2,491,472, is admixed with a water-miscible organic solvent such as heretofore described. [Where the polymer base to be prepared is to be employed in compositions containing a particular desired organic solvent, e.g. a low molecular weight alcohol, the solvent employed in this step should preferably be the solvent desired in the final polymeric composition.] To the resulting solution the alkaline neutralizing material, e.g. a strong base such as sodium or potassium hydroxide, is then added to effect conversion of the salt to the free base. Upon neutralizing in this manner, it has been found, quite unexpectedly, that the reaction mixture separates into two layers or phases, an upper organic layer containing the desired polymer base, solvent and water; and a lower aqueous phase containing the inorganic salt formed by the reaction, unreacted monomer and catalyst. The respective layers may be readily separated by conventional techniques, e.g. draining off the bottom aqueous phase, to provide a substantially pure organic solution of the desired polymer. As there is little loss, if any, of polymer in the aqueous phase, the amount of polymer in the organic phase is readily ascertainable or calculable by reference to the amounts of ingredients employed in the polymerization reaction. By way of illustration, in the polymerization to form poly-2-vinylpyridine [in the manner described hereinafter in Example 1] the purity of the monomer employed was calculated at approximately 97%, and the polymerization reaction did not go to completion, leaving about 2% of free monomer. Hence, the amount of polymer base formed may be calculated as a 95% yield. As the amount of polymer in the organic solution may be determined with sufficiently accurate consistency, unlike the prior procedure, it is no longer necessary first to analyze the solution to determine the amount of polymer present in order to determine the amounts of other ingredients to be added to obtain a composition having particular desired proportions of these additives to polymer. Accordingly, one may add from process batch to process batch the same precalculated amounts of additives to form substantially uniform batches of the desired composition.

Following neutralization of the polymer salt in accordance with this invention, the organic solution containing the free base may be stored for suitable lengths of time, if desired, prior to formation of compositions containing the same. Alternatively, if desired the polymer may be recovered from solution by suitable techniques such as by distillation. Polymer recovered in this manner has been found to be effectively pure, containing substantially no entrained impurities as in the prior procedures.

The reaction by which neutralization is effected may be carried out at room temperature. In so doing, however, it will be noted that the reaction is exothermic and may raise the temperature, say, on the order of 20° C. Hence, while the starting temperature of reaction may vary, in general it may be said that the starting temperature should be selected and the reaction subsequently controlled within limits so that the temperature does not exceed the boiling point of the organic solvent employed. However, it has been found that the heat of neutralization (exotherm) which raises the temperature ensures a quick separation of the respective phases and, therefore, within the above limits should not be avoided.

The time of reaction is not critical and may likewise vary. In any event, it will be apparent that the reaction is complete when the reaction mixture has separated into the aforementioned two phases. For optimum results it may be desired to apply agitation following addition of the alkaline neutralizing agent to hasten completeness of reaction and subsequent separation.

The alkaline material employed should be selected so as to form, upon neutralization, a water-soluble inorganic salt to obtain separation of this salt in the aqueous phase.

The amount of alkaline material employed may also vary, the amount being selected so as to ensure complete neutralization so that substantially no neutralizable polymer (water-soluble polymeric salt) is lost in the aqueous phase. In the case of vinylpyridine polymers such as poly-2-vinylpyridine, for optimum results the amount of alkaline material employed is such as to provide a pH of the reaction mixture on of the order of about pH 7. When this pH is exceeded, small fractions of the above noted brown impurities or sludge may precipitate and cause browning or yellowing of the product. This precipitation is particularly noticeable when a pH on the order of 9 or greater is attained. Thus, pH control may be advisable to ensure fractionation of the polymer from impurities. In this regard, it was found that polyvinylpyridines such as poly-2-vinylpyridine function as pH indicators in this reaction, the color changing from yellow to pink as a pH on the order of 7 is approached, e.g. at about pH 6.85. Hence, one may readily ascertain the most preferred amounts of alkaline material to be employed by observance of the color of the reaction mixture.

The following example shows by way of illustration and not by way of limitation the formation of polymers containing basic groups in accordance with this invention.

EXAMPLE 1

To 406 ml. of cold water was added 325 ml. (406 g.) of impure poly-2-vinylpyridine sulfate (prepared in the manner described in the aforementioned U.S. Pat. No. 2,491,472). To the resulting clear solution was added, with agitation, 260 ml. of isopropanol to form a homogeneous milky mixture. While continuing agitation, a 50% sodium hydroxide solution was added until the pH of the resulting mixture was about 7, as noted by a color change of the mixture from yellow to a faint pink. [This required about 95 ml. (143 g.) of sodium hydroxide solution.] Agitation was continued for about another minute, after which it was stopped and the mixture was allowed to separate into a lower aqueous layer and an upper organic layer for 5 minutes. The lower aqueous layer was drained and the remaining organic layer was allowed to separate for an additional 10 minutes, during which, a further aqueous phase and a brown amorphous suspension were separated. This aqueous phase and amorphous suspension were also drained to provide an organic phase containing substantially pure poly-2-vinylpyridine, the yield of which was calculated to be 95%. Organic layers prepared in this manner were found typically to have a density of about 1.0, a viscosity of 500–600 cps. and to consist essentially of 29% polymer, 40% isopropanol and 31% water, the proportions being by weight. The percent of sodium sulfate in the organic layer was less than 0.5%, indicating that substantially all sodium sulfate formed by neutralization was drained off in the aqueous phase. Distillation of solvent yielded the polymer, poly-2-vinylpyridine, which dried as white translucent flakes.

The following example illustrates the use of this invention in the preparation of printcoater compositions.

EXAMPLE 2

A printcoating composition such as described in the aforementioned U.S. Pat. No. 2,874,045 was prepared by adding to an organic phase prepared as in Example 1 at a temperature of about 50° C. and with agitation, glacial acetic acid, isopropanol, water, dimethyl hydantoin formaldehyde and zinc acetate, followed by, filtration and recovery of the clear filtrate coating composition. A preferred composition prepared in this manner comprised the foregoing ingredients in the following proportions:

| | | |
|---|---|---|
| Poly-2-vinylpyridine | g. | 10–25 |
| Dimethyl hydantoin formaldehyde | g. | 5–30 |
| Isopropanol | cc. | 30–50 |
| Water | cc. | 50–70 |
| Acetic acid | cc. | 1–7 |
| Zinc acetate | g. | 1–10 |

The novel procedures of this invention, as described above, have been found to obviate all of the objections to the prior processes and to afford certain unexpected new advantages.

It so reduces man hours and minimized tying up of equipment that increased productivity on the order of 4–5 times as great is readily obtainable. In addition, the loss of polymer dispersed in the waste water of the prior procedure is obviated so that increases in yield on the order of about 15% have been obtained.

The ability to fractionate the polymer from impurities, e.g. monomer, catalyst, permits the obtaining of a product of greatly enhanced quality and uniform consistency from batch to batch.

The elimination of the need for analysis to determine the percent of polymer in the organic solution makes it possible to employ a common formula of additives from batch to batch, thereby appreciably speeding up the manufacture and reducing labor.

Due to the controlled neutralization conditions, considerable savings in production costs are obtained by avoiding the need to use excessive amounts of alkaline neutralizing material and repeated washings of the resulting polymer.

The ability to handle the neutralization in a closed system requiring no handling or exposure by the worker completely eliminates the problem relating to noxious and irritating odors. Any unreacted monomer liberated during neutralization is retained in the aqueous phase and hence may be drained to the sewerage under a closed system.

From a comparison of the steps in the prior processes and that of the present invention, the great reduction in steps and subsequent reduction of labor makes it readily apparent that other reductions in production costs are also obtained.

From the foregoing description it will be seen that the essence of the invention is the provision of a greatly improved procedure for neutralizing the polymeric salt obtained by polymerizing an aqueous solution of a monomeric salt, e.g. a mineral acid salt of a vinylpyridine monomer. This procedure in turn provides improved procedures for preparing compositions containing the polymer base so formed, e.g. printcoater compositions such as disclosed in the aforementioned patents pertaining thereto. Hence, for purposes of this invention, the nature and description of the additives to the organic solution containing the polymer are immaterial. By way of example only, these additives to form a printcoater composition may include, as stated in the above-noted patents, a salt of a heavy metal which forms an insoluble sulfide, e.g. a water-soluble salt which contains a heavy metal cation such as cadmium, lead, manganese, zirconium or tin and an anion such as acetate, sulfate, nitrate or formate; an acid, preferably weak, such as acetic or propionic acid; a plasticizer for the polymer, e.g. a hydantoin formaldehyde condensation polymer such as dimethyl hydantoin formaldehyde, etc. It may also contain other additives in addition to, or in lieu of those previously named.

It will also be appreciated that the invention is applicable to other uses. For example, separation of the solvent after neutralization permits one to obtain the substantially pure dry polymer in high yield.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. A process for preparing polyvinylpyridines which comprises the steps of providing an aqueous solution of a basic vinylpyridine monomer and a mineral acid to form a monomeric vinylpyridine salt; polymerizing said monomeric salt in the presence of a peroxygen compound catalyst to form a water-soluble vinylpyridine polymer salt; adding to the aqueous solution containing said polymer salt an organic solvent selected from the group consisting of low molecular weight water-miscible alcohols and ketones; thereafter adding an alkaline neutralizing agent to neutralize said polymer salt and to form an organic phase containing said free base polyvinylpyridine formed by neutralization and an aqueous neutralization; and separating said organic phase from said aqueous phase.

2. A process as defined in claim 1 wherein said monomer is 2-vinylpyridine and said free base is poly-2-vinylpyridine.

3. A process as defined in claim 1 including the step of adding to said organic phase, following said separation step, predetermined amounts of ingredients necessary for forming, in said organic phase, a composition for washing and protecting a photographic silver image.

4. A process as defined in claim 3 wherein said ingredients include a salt of a heavy metal capable of forming an insoluble sulfide and a weak organic acid.

5. A process as defined in claim 4 wherein said ingredients further include a hydantoin formaldehyde condensation polymer.

6. A process for preparing a vinylpyridine polymer free base from an aqueous solution of a vinylpyridine polymer salt of a mineral acid which comprises the steps of adding to said aqueous solution a water-miscible organic solvent for said free base; and thereafter adding to the thus-formed solution an alkaline neutralizing agent to neutralize said polymer salt and to form an organic phase containing said vinylpyridine polymer free base and an aqueous phase containing the inorganic salt formed by said neutralization, said organic phase consisting essentially of water, said organic solvent and said polymer base.

7. A process as defined in claim 6 wherein said alkaline neutralizing agent is a strong base.

8. A process as defined in claim 7 wherein said organic solvent is selected from the group consisting of low molecular weight alcohols and ketones and said agent is sodium hydroxide.

9. A process as defined in claim 6 wherein said alkaline neutralizing agent is employed in an amount sufficient to provide a pH of about 7.

10. A process as defined in claim 6 including the step of separating said aqueous phase from said organic phase.

11. A process as defined in claim 10 including the step of distilling said organic phase to recover said polymer effectively free from impurities.

12. A process as defined in claim 6 wherein said salt is a salt of poly-2-vinylpyridine and said free base is poly-2-vinylpyridine.

13. A process for preparing a composition for washing and protecting a photographic silver image which comprises the steps of polymerizing a 2-vinylpyridine salt of a mineral acid in an aqueous medium to form a water-soluble poly-2-vinylpyridine salt; adding to the aqueous solution containing said polymer salt an organic solvent selected from the group consisting of low molecular weight water-miscible alcohols and ketones; thereafter adding to the thus-formed solution a strong base neutralizing agent to convert said poly-2-vinylpyridine salt to the free base, poly-2-vinylpyridine, and to form an organic phase containing essentially said free base polymer and an aqueous phase containing the organic salt formed by said neutralization; separating said organic phase containing said free base polymer from said aqueous phase; and adding to said organic phase predetermined effective amounts of ingredients necessary to form said composition, said ingredients comprising a salt of a heavy metal capable of forming an insoluble sulfide, a weak organic acid and a hydantoin formaldehyde condensation polymer.

14. A process as defined in claim 13 wherein said strong base is added in an amount sufficient to provide a pH of about 7.

15. A process as defined in claim 13 wherein said salt is 2-vinylpyridine sulfate; said solvent is isopropanol; and said strong base is sodium hydroxide.

16. A process as defined in claim 15 wherein said heavy metal salt is a zinc salt; said acid is acetic acid; and said condensation polymer is dimethyl hydantoin formaldehyde.

References Cited

UNITED STATES PATENTS

| | | | |
|---|---|---|---|
| 2,491,472 | 12/1949 | Harmon | 260—88.3 |
| 2,683,129 | 7/1954 | Bratton et al. | 260—34.2 |
| 2,691,008 | 10/1954 | Grim | 260—33.4 |
| 2,739,954 | 3/1956 | Fryling | 260—34.2 |
| 2,830,900 | 4/1958 | Land et al. | |
| 2,866,705 | 12/1958 | Land et al. | |
| 2,874,045 | 2/1959 | Land. | |
| 2,979,477 | 4/1961 | Land | 260—33.4 |

MORRIS LIEBMAN, Primary Examiner

P. R. MICHL, Assistant Examiner

U.S. Cl. X.R.

260—33.4, 34.2, 88.3